(12) United States Patent
Kirihata

(10) Patent No.: US 8,854,674 B2
(45) Date of Patent: Oct. 7, 2014

(54) IMAGE FORMING APPARATUS EQUIPPED WITH REAL SIZE PREVIEW FUNCTION, METHOD OF DISPLAYING IMAGE, AND STORAGE MEDIUM

(71) Applicant: Canon Kabushiki Kaisha, Tokyo (JP)

(72) Inventor: Daiji Kirihata, Kawasaki (JP)

(73) Assignee: Canon Kabushiki Kaisha (JP)

( * ) Notice: Subject to any disclaimer, the term of this patent is extended or adjusted under 35 U.S.C. 154(b) by 124 days.

(21) Appl. No.: 13/722,351

(22) Filed: Dec. 20, 2012

(65) Prior Publication Data

US 2013/0163049 A1 Jun. 27, 2013

(30) Foreign Application Priority Data

Dec. 22, 2011 (JP) ................................. 2011-281484

(51) Int. Cl.
*G06F 3/12* (2006.01)
*G06K 15/02* (2006.01)
*H04N 1/00* (2006.01)
*G06F 15/00* (2006.01)
*G06K 1/00* (2006.01)
*G06K 15/00* (2006.01)

(52) U.S. Cl.
CPC .............. *G06K 15/02* (2013.01); *G06F 3/1279* (2013.01); *G06F 3/1271* (2013.01); *G06F 3/1256* (2013.01); *G06F 3/1208* (2013.01); *G06K 15/005* (2013.01); *H04N 1/00* (2013.01)
USPC ............ 358/1.15; 358/1.1; 358/1.9; 358/1.13

(58) Field of Classification Search
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

FOREIGN PATENT DOCUMENTS

JP  2010-272049 A  12/2010
JP  2011-118586 A  6/2011

*Primary Examiner* — Thierry L Pham
(74) *Attorney, Agent, or Firm* — Rossi, Kimms & McDowell LLP

(57) ABSTRACT

An image forming apparatus having a preview function which enables a user to select a desired area of a print image and is capable of providing a real size preview of the area selected by the user. A bird's eye preview unit displays the image by changing a size of the image, to a size which enables the whole image to be displayed on a display unit. A real size preview unit performs real size preview display of the image. A real size preview display area-setting unit accepts a setting of a preview display area of the image for being displayed by the real size preview display, from the image displayed by the bird's eye preview display. The real size preview unit displays an image within the set preview display area on the display unit.

9 Claims, 11 Drawing Sheets

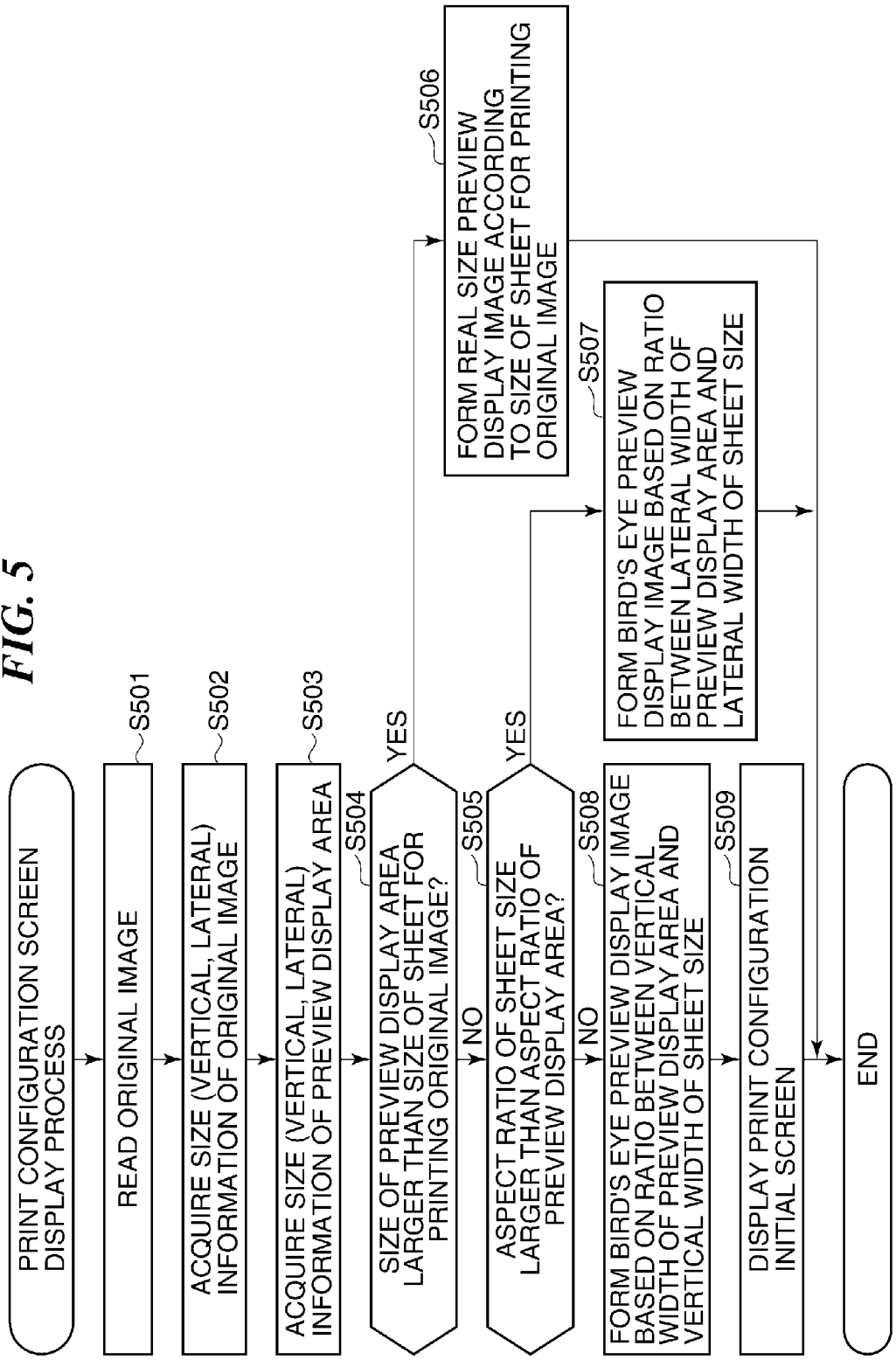

IMAGE FORMING APPARATUS EQUIPPED WITH REAL SIZE PREVIEW FUNCTION, METHOD OF DISPLAYING IMAGE, AND STORAGE MEDIUM

BACKGROUND OF THE INVENTION

1. Field of the Invention

The present invention relates to an image forming apparatus, a method of displaying an image, and a storage medium, and more particularly to a preview function of an image forming apparatus.

2. Description of the Related Art

Some of image forming apparatuses, such as a multi-function peripheral and a printer, have preview functions for the purpose of reducing print errors. The preview functions include, for example, a function capable of displaying characters and graphics included in an image to be printed, in the same sizes as when they are printed on a sheet. Hereinafter, such a preview function is referred to as the "real size preview function", and displaying an image using the real size preview function is referred to as "real size preview display".

In the real size preview function, there has been proposed a method which automatically determines a character having the smallest size in a print image, and sets an area including the character as a real size preview area (see e.g. Japanese Patent Laid-Open Publication No. 2010-272049). According to this technique, since the smallest character included in the print image can be checked by the real size preview display, it is possible to prevent a print error in which small characters are printed in a crushed manner and are illegible.

In the above-described conventional technique, however, the real size preview display is performed as to the area including the smallest character in the print image, but it is impossible for a user to select an area desired to check. This prevents the user from having a real size preview of areas except the area including the smallest character.

In short, the preview function of the conventional image forming apparatus cannot enable the user to select a desired area of a print image, and hence cannot provide a real size preview of the desired area selected by the user.

SUMMARY OF THE INVENTION

The present invention provides an image forming apparatus having a preview function which enables a user to select a desired area of a print image and is capable of providing a real size preview of the desired area selected by the user.

In a first aspect of the present invention, there is provided an image forming apparatus which is capable of performing preview display of an image on a display unit, comprising a bird's eye preview unit configured to perform bird's eye preview display of the whole image by changing a size of the image to a size which enables the whole image to be displayed on the display unit, based on a printing resolution of the image, a display resolution of the display unit, sheet size information of the image, and display size information of the display unit, a real size preview unit configured to perform real size preview display of the image, in which a displayed image has a same size as a size of an image formed by printing the displayed image, based on the printing resolution of the image and the display resolution of the display unit, and a real size preview display area-setting unit configured to accept a setting of a preview display area of the image for being displayed by the real size preview display by the real size preview unit, which has been made on the image displayed by the bird's eye preview display by the bird's eye preview unit, wherein the real size preview unit displays an image within the area set by the real size preview display area-setting unit, on the display unit.

In a second aspect of the present invention, there is provided a method of displaying an image by an image forming apparatus which is capable of performing preview display of an image on a display unit, comprising performing bird's eye preview display of the whole image by changing a size of the image to a size which enables the whole image to be displayed on the display unit, based on a printing resolution of the image, a display resolution of the display unit, sheet size information of the image, and display size information of the display unit, performing real size preview display of the image, in which a displayed image has a same size as a size of an image formed by printing the displayed image, based on the printing resolution of the image and the display resolution of the display unit, and accepting a setting of a preview display area of the image for being displayed by the real size preview display, which has been made on the image displayed by the bird's eye preview display, wherein the real size preview display displays an image within the area set by the accepting, on the display unit.

In a third aspect of the present invention, there is provided a non-transitory computer-readable storage medium storing a computer-executable program for causing a computer to execute a method of displaying an image by an image forming apparatus which is capable of performing preview display of an image on a display unit, wherein the method comprises performing bird's eye preview display of the whole image by changing a size of the image to a size which enables the whole image to be displayed on the display unit, based on a printing resolution of the image, a display resolution of the display unit, sheet size information of the image, and display size information of the display unit, performing real size preview display of the image, in which a displayed image has a same size as a size of an image formed by printing the displayed image, based on the printing resolution of the image and the display resolution of the display unit, and accepting a setting of a preview display area of the image for being displayed by the real size preview display, which has been made on the image displayed by the bird's eye preview display, wherein the real size preview display displays an image within the area set by the accepting, on the display unit.

According to the present invention, it is possible to enable the user to select a desired area and provide a real size preview of the selected area. This makes it possible for the user to check a desired area by the real size preview display.

Further features of the present invention will become apparent from the following description of exemplary embodiments with reference to the attached drawings.

BRIEF DESCRIPTION OF THE DRAWINGS

FIG. 5 is a flowchart of a print configuration screen display process.

DESCRIPTION OF THE EMBODIMENTS

The present invention will now be described in detail below with reference to the accompanying drawings showing embodiments thereof.

Figure 1:
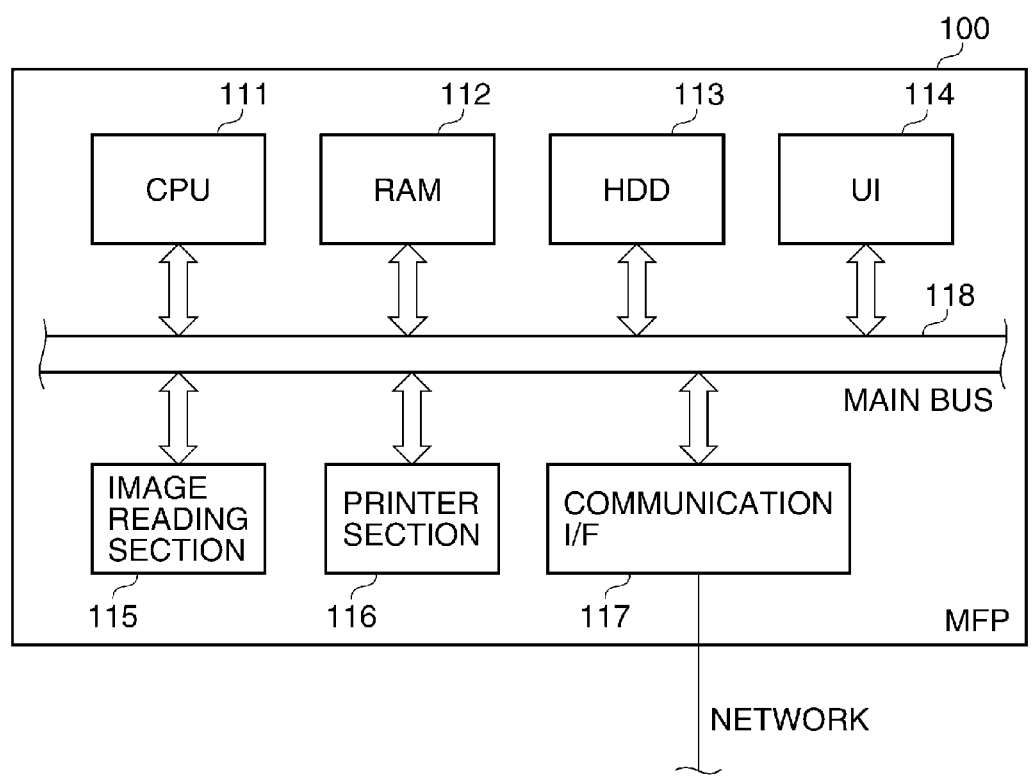
FIG. 1 is a schematic block diagram of an MFP as an image forming apparatus according to a first embodiment of the present invention.

FIG. 1 is a schematic block diagram of an image forming apparatus according to a first embodiment of the present invention.

Referring to FIG. 1, an MFP (multifunction peripheral) 100 is an example of the image forming apparatus according to the first embodiment of the present invention. The MFP 100 includes a CPU 111, a RAM 112, a hard disk drive (HDD) 113, a user interface (UI) 114, an image reading section 115, a printer section 116, a communication interface (I/F) 117, and a main bus 118.

The CPU 111 controls the RAM 112, the HDD 113, the user interface 114, the image reading section 115, the printer section 116, and the communication interface 117, which are connected to the main bus 118. The RAM 112 is a readable and writable memory that functions as a work area for the CPU 111. The HDD 113 is a nonvolatile storage device for storing programs, described hereinafter, and various kinds of configuration information. Note that the HDD 113 may be an NVRAM (nonvolatile RAM) or the like.

The user interface 114 not only functions as an input device for accepting an operation by a user (including an installation personnel), but also functions as a display device for displaying information for the user. For example, the user interface 114 is implemented by a touch panel and the like, via which the user can perform an operation input.

The image reading section 115 reads an image from an original. The printer section 116 prints the image on a medium, such a sheet. The communication interface 117 controls communication between the MFP 100 and an external apparatus (not shown) e.g. via a network. The main bus 118 is a transmission path for transmitting and receiving data between the above-mentioned sections of the MFP 100.

Figure 2:
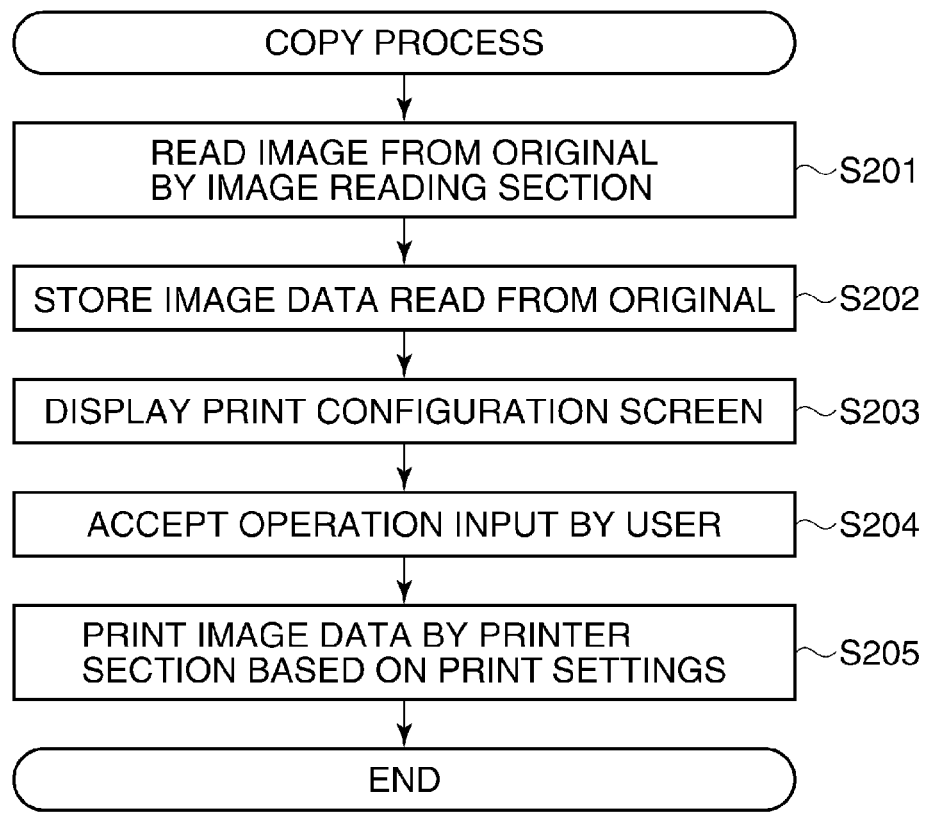
FIG. 2 is a flowchart of a copy process executed by the MFP shown in FIG. 1.

FIG. 2 is a flowchart of a copy process executed by the MFP 100 shown in FIG. 1.

In a step S201, the CPU 111 causes the image reading section 115 to read an image from an original placed on an original platen glass (not shown) or an original conveyed to an image reading position from an automatic document feeder (not shown).

In a step S202, the CPU 111 stores image data of an original image read by the image reading section 115 (hereinafter also referred to as a "print image") in the RAM 112.

In a step S203, the CPU 111 displays a print configuration screen for configuring print settings of the original image on the user interface 114.

In a step S204, the CPU 111 accepts operations by the user on the print configuration screen displayed on the user interface 114, and changes the print settings of the original image or changes contents displayed on the user interface 114.

In a step S205, the CPU 111 processes the image data based on the print settings configured in the step S204 according to a print instruction (or a copy instruction) from the user. Then, the CPU 111 transfers the processed image data and the print settings to the printer section 116. The printer section 116 performs print processing on a predetermine sheet fed for printing.

Next, the print configuration screen displayed on the user interface 114 in the steps S203 and S204 in FIG. 2 will be described with reference to FIGS. 3A, 3B, 4A and 4B.

Figure 3A:
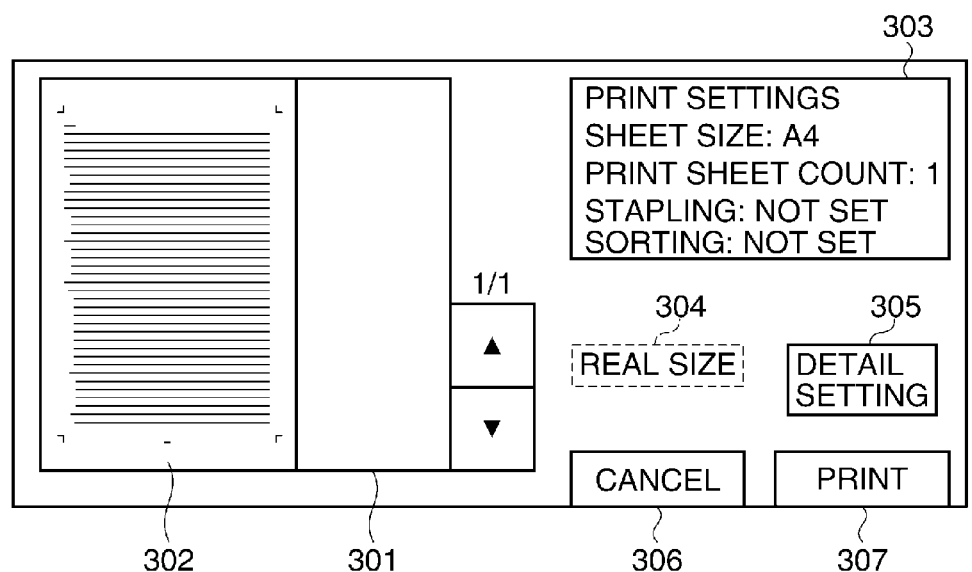
FIG. 3A is a view showing an example of an initial screen of a print configuration screen.

FIG. 3A is a view showing an example of an initial screen of the print configuration screen displayed on the user interface 114 immediately after the original image has been read.

In FIG. 3A, reference numeral 301 denotes a preview display area in which a preview display image of the original image read by the image reading section 115 is displayed. The CPU 111 forms a bird's eye preview display image or a real size preview display image, and displays the same in the preview display area 301. Note that the phrase "to display the bird's eye preview display image" is intended to mean "to display the original image as a preview display image by changing the size of the original image to a size enabling the whole original image to be displayed in the preview display area 301". Further, the phrase "to display the real size preview display image" is intended to mean "to display an image such that characters and graphics included in the original image have the same sizes as when they are printed on a sheet", as described hereinabove. More generally, the real size preview display is defined as performing display such that a displayed image has a same size as a size of an image formed by printing the displayed image.

In the preview display area 301, an operation input by the user can be accepted in a state in which the original image is displayed as a bird's eye preview display image.

Reference numeral 302 denotes the bird's eye preview display image of the original image displayed in the preview display area 301. Reference numeral 303 denotes a print setting display area for displaying print settings of the original image.

Reference numeral 304 denotes a real size display button. When no operation input by the user is accepted in the preview display area 301 in the state in which the original image is displayed as the bird's eye preview display image, the real size display button 304 is disabled. When a predetermined operation input by the user is performed to the preview display area 301 in the state in which the original image is displayed as the bird's eye preview display image, the print configuration screen is shifted to a screen shown in FIG. 3B, on which the real size display button 304 is enabled. When the real size display button 304 is touched, the CPU 111 switches the bird's eye preview display image displayed in the preview display area 301 to a real size preview display image.

Reference numeral 305 denotes a detail setting button for changing the details of the print settings of the original image.

Reference numeral 306 denotes a cancel button. When the cancel button 306 is touched, the CPU 111 cancels the copy process. Reference numeral 307 denotes a print button. When the print button is touched, the CPU 111 performs the process described in the step S204 in FIG. 2.

Figure 3B:
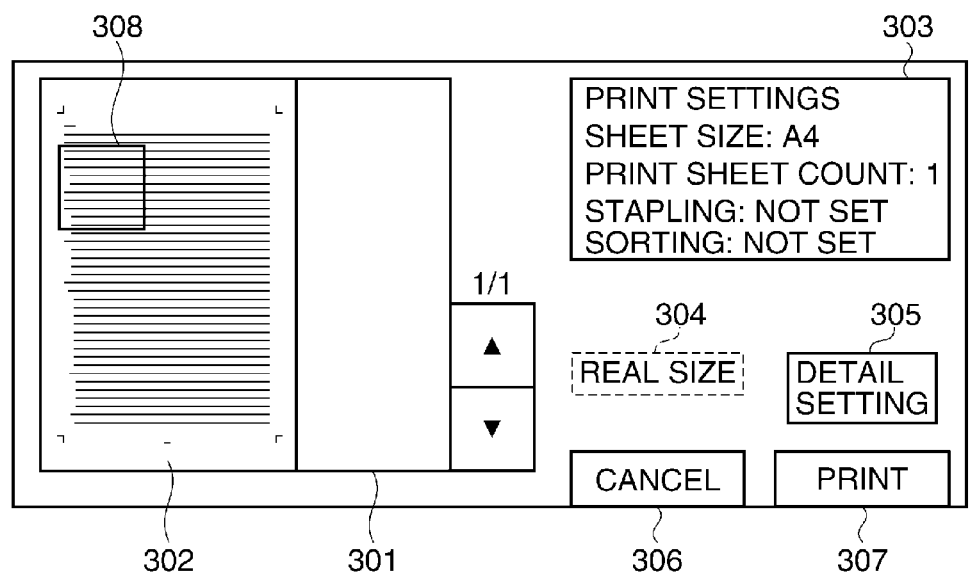
FIG. 3B is a view of an example of a screen of the print configuration screen displayed when a user's operation is accepted in a preview display area.

FIG. 3B is a view of an example of the print configuration screen displayed when a user's operation is accepted in the preview display area 301.

In the preview display area 301 in which the bird's eye preview display image is displayed, the user can designate an area for displaying a real size preview display image (hereinafter referred to as a "real size preview display area") on the original image. In the present embodiment, when an input (touch) to a point (single point) in the preview display area 301 is accepted as an operation input by the user, the user can designate the real size preview display area on the original image. For example, the CPU 111 sets a predetermined area surrounding a point touched by the user as the real size preview display area. After accepting an input to a certain single point (touch to the point), when an input to another single point (touch to another point) is accepted, a new predetermined area surrounding the other point is set as a real size preview display area.

Figure 4A:
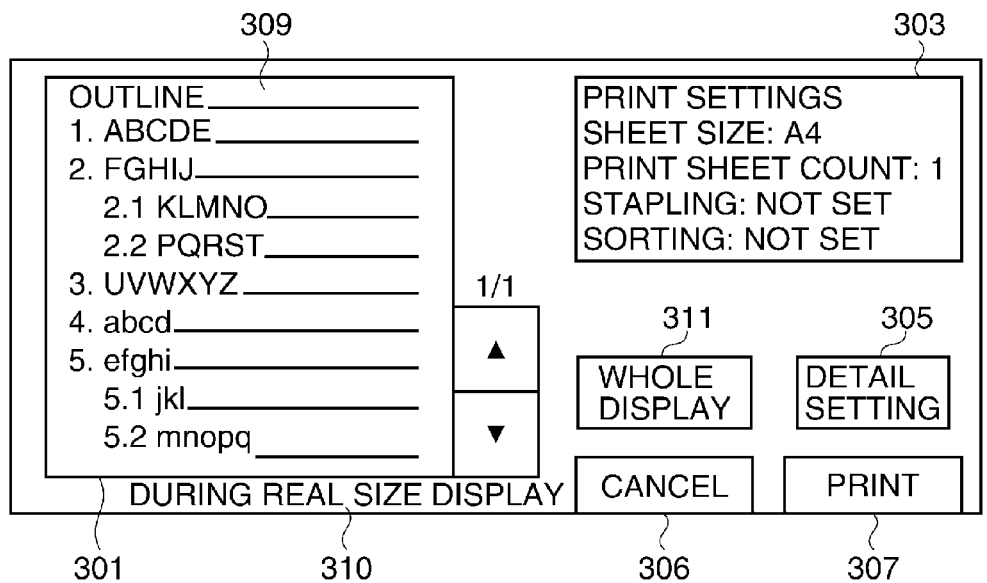
FIG. 4A is a view of an example of a screen of the print configuration screen on which a real size preview display image is displayed.

In the display state illustrated in FIG. 3B, if the real size display button 304 is touched, the print configuration screen is shifted to a screen shown in FIG. 4A.

Reference numeral 308 in FIG. 3B denotes a frame of a real size preview display area (real size preview display area frame). The CPU 111 decides the real size preview display area of the original image in response to a user's operation accepted on the bird's eye preview display image displayed in the preview display area 301. Then, the CPU 111 displays the decided area as the real size preview display area frame 308. The real size preview display area frame 308 is configured to be capable of moving on the bird's eye preview display image displayed in the preview display area 301 in response to a user's operation.

FIG. 4A is a view of an example of a screen of the print configuration screen on which a real size preview display image is displayed in the preview display area 301.

Reference numeral 309 denotes the real size preview display image displayed in the preview display area 301. Reference numeral 310 denotes a real size preview display message which is displayed during display of the real size preview display image. Reference numeral 311 denotes a whole display button which is displayed in place of the real size display button 304 during display of the real size preview display image. If the whole display button 311 is touched, the print configuration screen returns to the display state illustrated in FIG. 3A. Note that the print configuration screen may be configured to return to the display state illustrated in FIG. 3B.

Figure 4B:
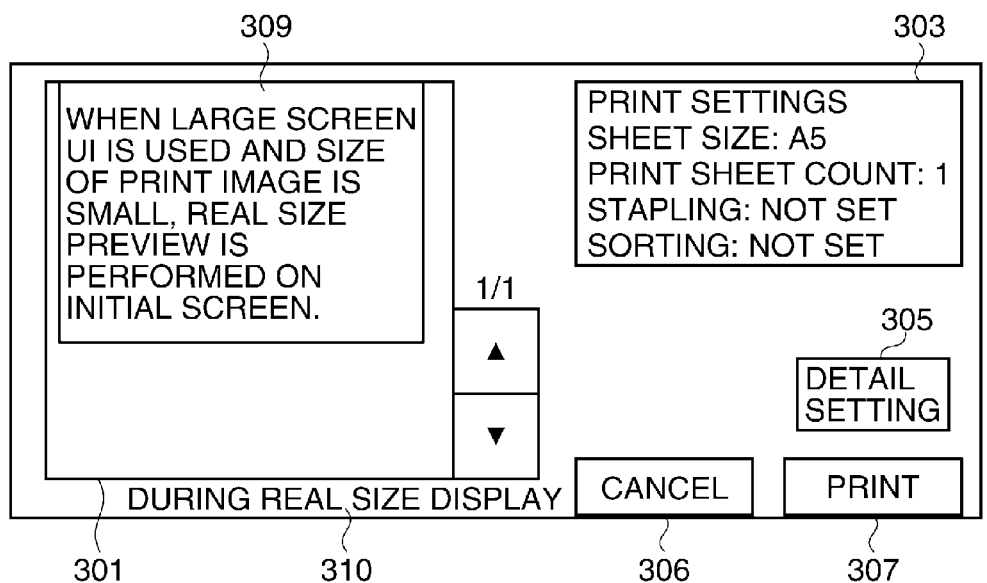
FIG. 4B is a view showing another example of the initial screen of the print configuration screen, which is displayed when a display size of the preview display area is larger than the size of a sheet for use in printing an original image.

FIG. 4B is a view showing another example of the initial screen of the print configuration screen, which is displayed when a display size of the preview display area 301 is larger than the size of a sheet for use in printing an original image.

The CPU 111 compares the size of a sheet for use in printing the original image and the display size of the preview display area 301. When it is determined that the display size of the preview display area 301 is larger, the CPU 111 creates a real size preview display image having the same size as the size of a sheet for use in printing the original image, and displays the preview display image in the preview display area 301. Note that when the comparison between the size of the sheet for use in printing the original image and the display size of the preview display area 301 indicates that the display size of the preview display area 301 is smaller, the CPU 111 executes a step S507 or S508 in FIG. 5, described hereinafter.

Next, a print configuration screen display process performed before the print configuration screen illustrated in FIG. 3A or 4B is displayed on the user interface 114 will be described with reference to FIG. 5.

FIG. 5 is a flowchart of the print configuration screen display process executed by the CPU 111.

In a step S501, the CPU 111 reads out image data of the original image from the RAM 112.

In a step S502, the CPU 111 acquires sheet size information of the original image. The sheet size information includes both the vertical length and the lateral length of the sheet. For example, if the size of a sheet for use in printing the original (original sheet size) is A4, the vertical length and the lateral length of the sheet size information are 297 mm and 210 mm, respectively. Although this sheet size information may be acquired from an original sheet size set when the user gives a copy instruction to the MFP 100, the sheet size information may be configured to be capable of being directly acquired from the original image read from the RAM 112.

In a step S503, the CPU 111 acquires display size information of the preview display area 301. The display size information of the preview display area 301 includes both the vertical length and the lateral length of the preview display area 301. The display size information of the preview display area 301 is stored in advance e.g. in the HDD 113.

In a step S504, the CPU 111 compares the size of the sheet for use in printing the original image, acquired in the step S502, and the display size of the preview display area 301 in the display size information, acquired in the step S503. The CPU 111 determines whether or not the display size of the preview display area 301 is larger than the size of the sheet for use in printing the original image. Specifically, the CPU 111 compares the vertical length of the original image and the vertical length of the preview display area 301, and compares the lateral length of the original image and the lateral length of the preview display area 301. When the vertical length of the original image is smaller than the vertical length of the preview display area 301, and at the same time the lateral length of the original image is smaller than the lateral length of the preview display area 301, the process proceeds to a step S506. Otherwise, the process proceeds to a step S505. Conditions for proceeding to the step S505 include a condition that the vertical length of the original image is larger than the vertical length of the preview display area 301 or a condition that the lateral length of the original image is larger than the lateral length of the preview display area 301. Further, the CPU 111 proceeds to the step S505 when both the conditions are satisfied, i.e. when the vertical length and the lateral length of the original image are larger than the vertical length and the lateral length of the preview display area 301.

In the step S506, the CPU 111 forms a real size preview display image according to the size of the sheet for use in printing the original image. Specifically, the CPU 111 forms a real size preview display image to be displayed in the preview display area 301 by subjecting the original image to scaling processing based on the resolution (printing resolution) of the original image and the resolution (display resolution) of the preview display area 301.

In the step S505, the CPU 111 calculates the aspect ratio of the size of the sheet for use in printing the original image and the aspect ratio of the display size of the preview display area 301, for comparison with each other. When the aspect ratio of the size of the sheet for use in printing the original image is larger than the aspect ratio of the display size of the preview display area 301, the process proceeds to the step S507, whereas when the aspect ratio of the size of the sheet is smaller than that of the display size, the process proceeds to the step S508. For example, assuming that the original sheet size is A4, the aspect ratio of the size of the sheet is 1.414. Assuming that the vertical length of the preview display area 301 is 5 cm and the lateral length thereof is 10 cm, the aspect ratio of the display size of the preview display area 301 is 0.5. In this case, "the aspect ratio of the size of the sheet for use in printing the original image">"the aspect ratio of the display size of the preview display area 301" holds, and hence the process proceeds to the step S507.

In the step S507, the CPU 111 forms a bird's eye preview display image based on a ratio between the lateral size (lateral width) of the preview display area 301 and the lateral size (lateral width) of the sheet for use in printing the original image. Specifically, the CPU 111 forms a bird's eye preview display image to be displayed in the preview display area 301 by subjecting the original image to scaling processing based on the printing resolution of the original image, the display resolution of the preview display area 301, and the ratio between the lateral width of the preview display area 301 and the lateral width of the sheet size for printing the original image.

In the step S508, the CPU 111 forms a bird's eye preview display image based on a ratio between the vertical size (vertical width) of the preview display area 301 and the vertical size (vertical width) of the sheet for use in printing the original image. Specifically, the CPU 111 forms a bird's eye preview display image to be displayed in the preview display area 301 by subjecting the original image to scaling processing based on the printing resolution of the original image, the display resolution of the preview display area 301, and the ratio between the vertical width of the preview display area 301 and the vertical width of the sheet size for printing the original image.

In a step S509, the CPU 111 displays the preview display image formed in the step S506, S507, or S508 in the preview display area 301.

Next, a description will be given of a process performed when the real size preview display area frame 308 illustrated in FIG. 3B is displayed after the user's operation is accepted in the preview display area 301 on the print configuration screen illustrated in FIG. 3A.

Figure 6:
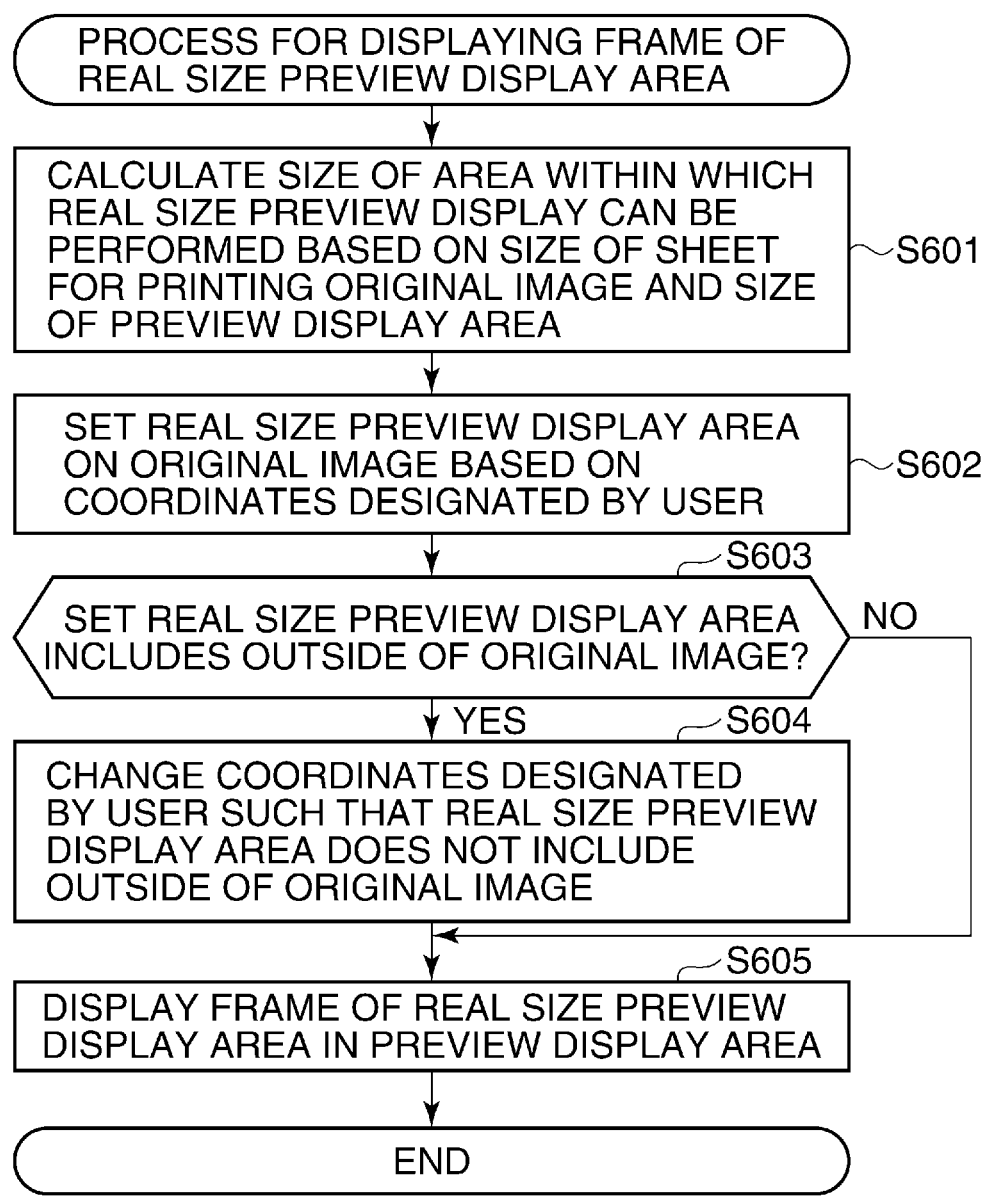
FIG. 6 is a flowchart of a process for displaying a frame of a real size preview display area.

FIG. 6 is a flowchart of a process for displaying the real size preview display area frame 308, which is executed by the CPU 111.

In a step S601, the CPU 111 calculates the size of an area (range) within which real size preview display can be performed in the preview display area 301, based on the size of the sheet for use in printing the original image and the display size of the preview display area 301. For example, when it is determined that the display size of the preview display area 301 is smaller than the size of the sheet for use in printing the original image, the display size of the preview display area 301 becomes the size of an area in which real size preview display can be performed.

In a step S602, the CPU 111 sets an area (range) for displaying the real size preview display image on the original image, based on the size of the area in which real size preview display can be performed, calculated in the step S601, and (the coordinates of) a single point designated by the user on the preview display area 301.

In a step S603, the CPU 111 determines whether or not the real size preview display area set in the step S602, includes an area outside the original image. In other words, the CPU 111 determines whether or not the real size preview display area is set in a manner extending off the original image. If the CPU 111 determines that the real size preview display area includes an area outside the original image, the process proceeds to a step S604, whereas if not, the process proceeds to a step S605.

In the step S604, the CPU 111 changes (the values of the coordinates of) the single point designated by the user such that the real size preview display area set in the step S602 does not include no area outside the original image.

In the step S605, the CPU 111 decides the real size preview display area on the original image, and displays the frame 308 of the decided real size preview display area.

Next, a description will be given of a process performed when the real size preview display image illustrated in FIG. 4A is displayed after the real size display button 304 is touched on the print configuration screen illustrated in FIG. 3B.

Figure 7:
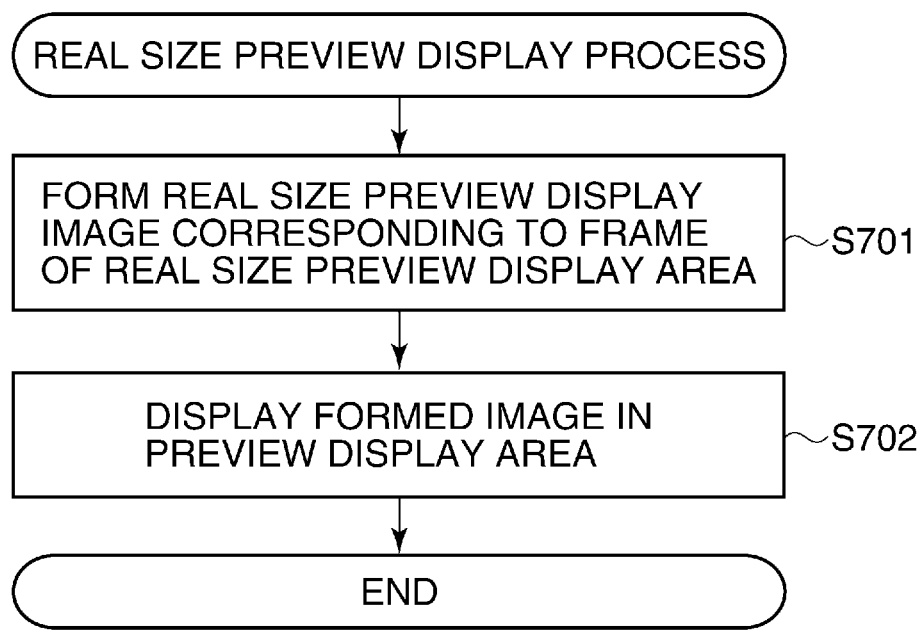
FIG. 7 is a flowchart of a process for displaying a real size preview display image.

FIG. 7 is a flowchart of a process for displaying a real size preview display image, executed by the CPU 111.

In a step S701, the CPU 111 forms a real size preview display image corresponding to the real size preview display area (the real size preview display area frame 308) on the original image. Specifically, the CPU 111 forms the real size preview display image by subjecting the original image to scaling processing based on the printing resolution of the original image and the display resolution of the preview display area 301, and extracting an image in the real size preview display area from the original image subjected to scaling processing.

In a step S702, the CPU 111 displays the real size preview display image formed in the step S701 in the preview display area 301.

According to the above-described first embodiment, a bird's eye preview display image is formed based on the printing resolution of the original image, the display resolution of the preview display area 301, the size of the sheet for use in printing the original image, and the display size of the preview display area 301. The setting of a real size preview display area is accepted on the bird's eye preview display image. A real size preview display image to be displayed in the set area is formed based on the printing resolution of the original image and the display resolution of the preview display area 301, and is displayed in the preview display area 301. This makes it possible for the user to select a desired area of a print image, and thereby makes it possible to display the area selected by the user as a real size preview display image.

Next, a second embodiment of the present invention will be described. An image forming apparatus according to the second embodiment is distinguished from the image forming apparatus according to the above-described first embodiment in a method of accepting a user's operation in the preview display area 301. In the above-described first embodiment, a user's operation at a single point is accepted, a real size preview display area is set on an original image, and the frame of a real size preview display area is displayed.

In the second embodiment, user's operations are accepted at two points in the preview display area 301, whereby a real size preview display area is set on an original image, and a frame of the real size preview display area is displayed. Note that the same components and elements as those of the first embodiment are denoted by the same reference numerals, and description thereof is omitted. In the following, a description will be given only of different points from the first embodiment.

Figure 8:
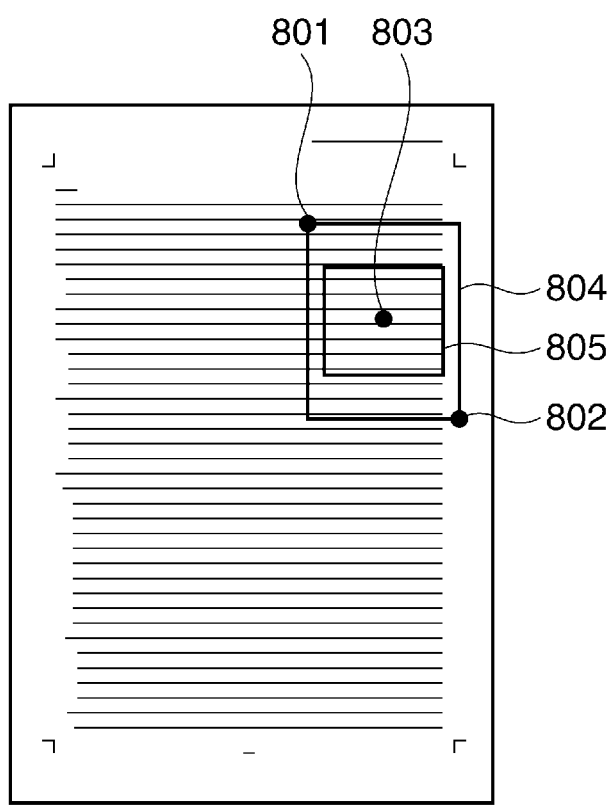
FIG. 8 is a view useful in explaining a method of setting a real size preview display area, according to a second embodiment of the present invention.

FIG. 8 is a view useful in explaining a method of setting the real size preview display area according to the second embodiment of the present invention.

In FIG. 8, a point 801 denotes a position (coordinates) where a user's first operation has been accepted, and point 802 denotes a position (coordinates) where a user's second operation has been accepted. Upon accepting the two user's operations as described above, the CPU 111 calculates a point 803 as the center of a line segment connecting between the points 801 and 802, and sets an area (range) 804 in which the user desires to perform real size preview display of a preview display image.

Now, a description will be given of a display method employed when the size of the area 804 in which the user desires to perform real size preview display is larger or smaller than a size of a display which can be made at a time in the preview display area 301.

The CPU 111 sets an area (frame) 805, which allows real size preview display at a time in the preview display area 301, around the point 803, and displays the area 805 as the frame of the real size preview display area. The illustrated example shows a case where the size of the area 804 in which the user desires to perform real size preview display is larger than the size of a display which can be made at a time in the preview display area 301.

Figure 9A:
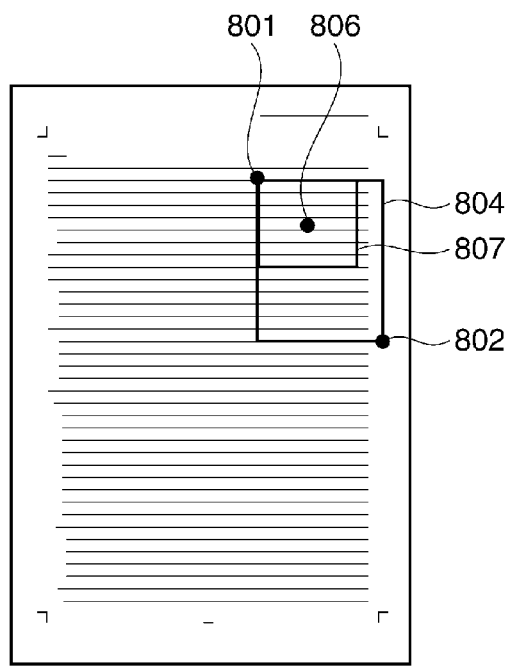
FIGS. 9A to 9C are views useful in explaining a case where the real size preview display area is displayed by animation.

When the size of the area 804 is larger than the size of a display which can be made at a time in the preview display area 301, the CPU 111 forms a real size preview display image such that the real size preview display image is displayed in the preview display area 301 by animation (animation display), so as to enable the user to visually recognize the whole area 804. The term "animation display" is intended to mean "displaying a real size preview display image while updating the same to gradually displace the position of the displayed image, as in the case of a moving image. For example, as shown in FIG. 9A, the CPU 111 calculates a center 806 based on the points 801 and 802. The center 806 serves as the center of a real size preview display area at the start of animation display. The CPU 111 sets an area (frame) 807 within which a real size preview display can be made at a time in the preview display area 301, based on the center 806, and forms a real size preview display image corresponding to the area (frame) 807.

Figure 9B:
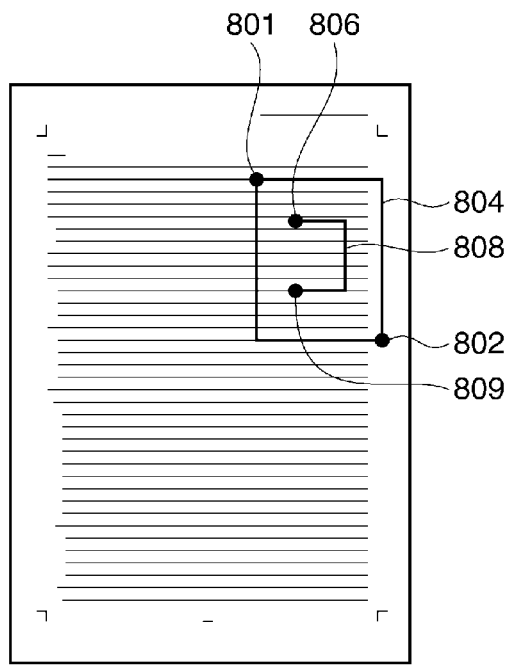
Figure 9C:
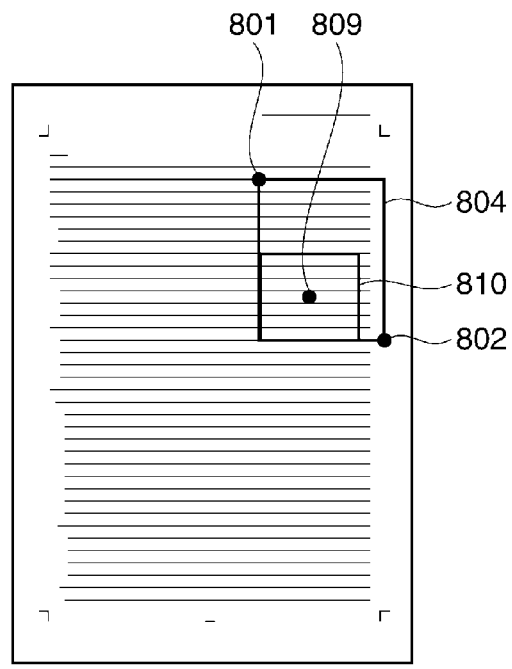

Next, the CPU 111 updates the center 806 and the position of the area (frame) within which a real size preview display can be made at a time in the preview display area 301, at predetermined time intervals, and displays the real size preview display image corresponding to the updated area in the preview display area 301. Such an update operation is repeatedly performed, whereby the real size preview display image is displayed in an animation-like manner. The path of the center of the real size preview display area is formed e.g. as shown by reference numeral 808 illustrated in FIG. 9B. In FIG. 9C, reference numeral 809 denotes the center of the real size preview display area at the time of termination of animation display, and reference numeral 810 denotes the real size preview display area set for the time of termination of the animation display. This makes it possible to perform real size preview display desired by the user even when an area in which the user desires to perform the real size preview display is larger than the size of a display which can be made at a time in the preview display area 301.

According to the second embodiment, an area desired by the user is selected by user input to a plurality of points in the preview display area 301, whereby the user can efficiently check an area that the user desires to check even when the size of the area is not fixed.

Next, a third embodiment of the present invention will be described. An image forming apparatus according to the third embodiment is distinguished from the image forming apparatus according to the above-described first embodiment in part of the process for displaying the frame of the real size preview display area, shown in FIG. 6.

Figure 10:
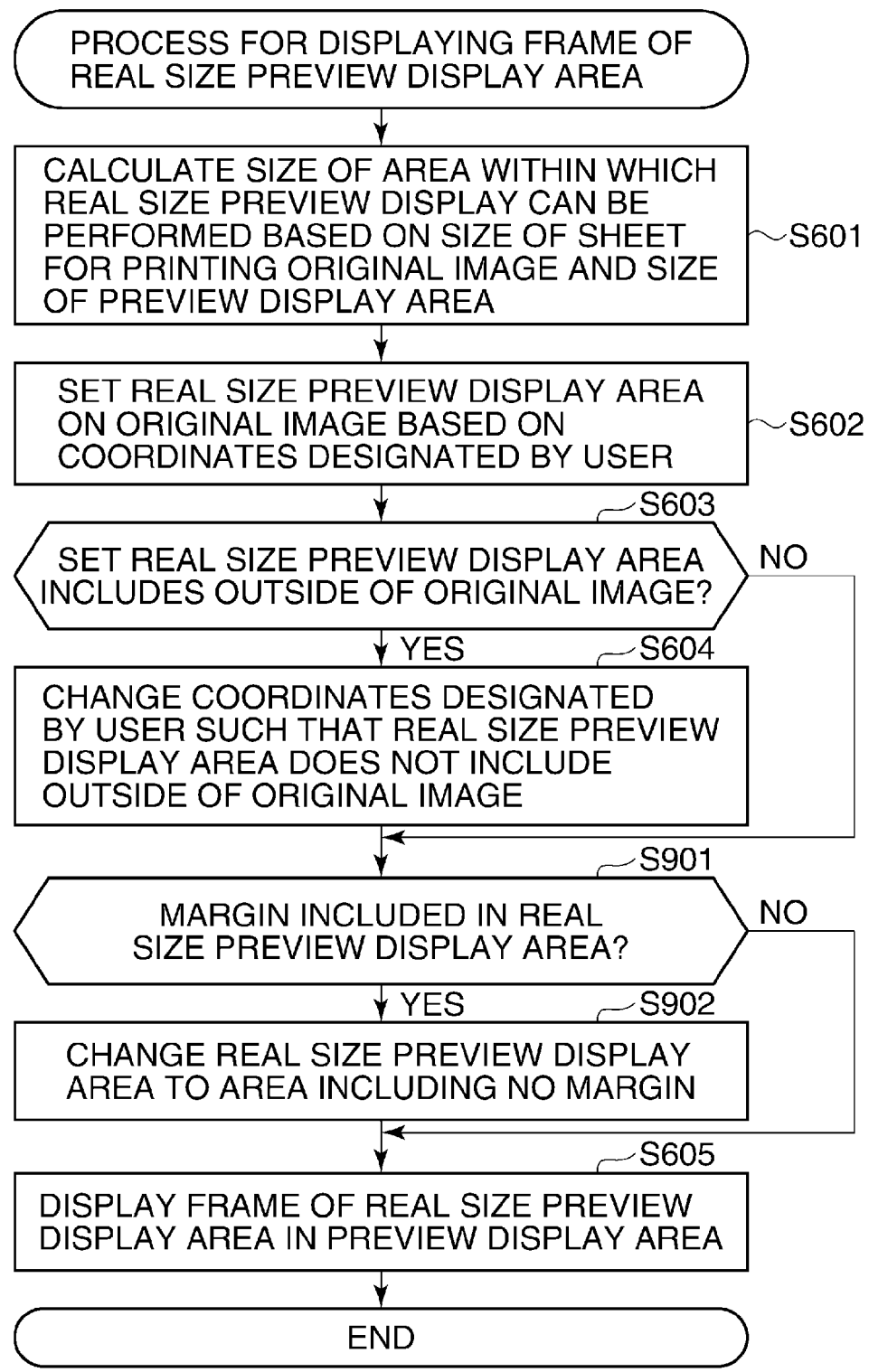
FIG. 10 is a flowchart of a process for displaying a frame of a real size preview display area according to a third embodiment of the present invention.

FIG. 10 is a flowchart of a process for displaying a frame of a real size preview display area according to the third embodiment of the present invention. Note that steps S601 to S605 appearing in FIG. 10 are the same as the steps S601 to S605 appearing in FIG. 6, and description thereof is omitted.

In a step S901, the CPU 111 determines whether or not the real size preview display area set in the step S602 includes a margin. In the step S901, the CPU 111 functions as a margin determination unit. If the CPU 111 determines that the real size preview display area includes a margin, the process proceeds to a step S902, whereas if not, the process proceeds to the step S605. Note that the margin refers to part of an original image, which has no characters or graphics.

Figure 11A:
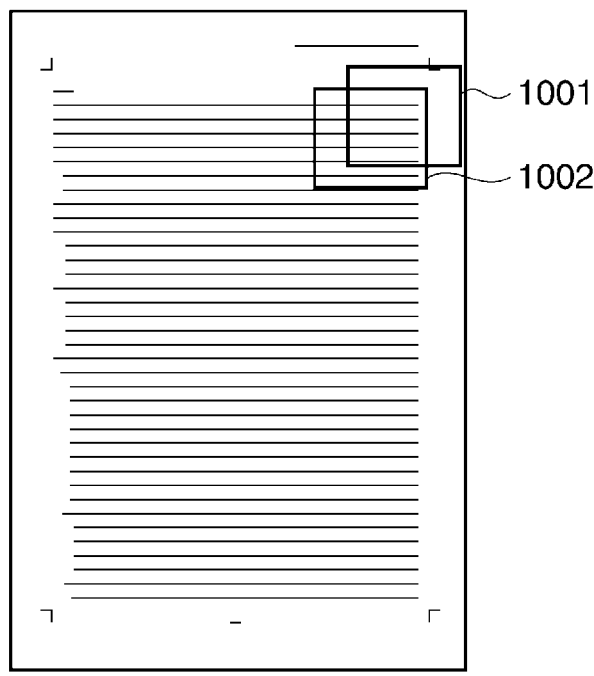
FIG. 11A is a view useful in explaining a change of a position of the real size preview display area to a position which excludes any margin.

In the step S902, the CPU 111 changes the position of the real size preview display area to a position which excludes any margin. It is preferable that the changed position of the real size preview display area is in the vicinity of its initial position. FIG. 11A shows an example of the case where the position of the real size preview display area has been changed to a position which excludes any margin.

In FIG. 11A, reference numeral 1001 denotes a real size preview display area including a margin. On the other hand, reference numeral 1002 denotes a real size preview display area after the position change in the step S902. The position of the area 1002 is changed from the position of the area 1001 to a position which excludes any margin.

Figure 11B:
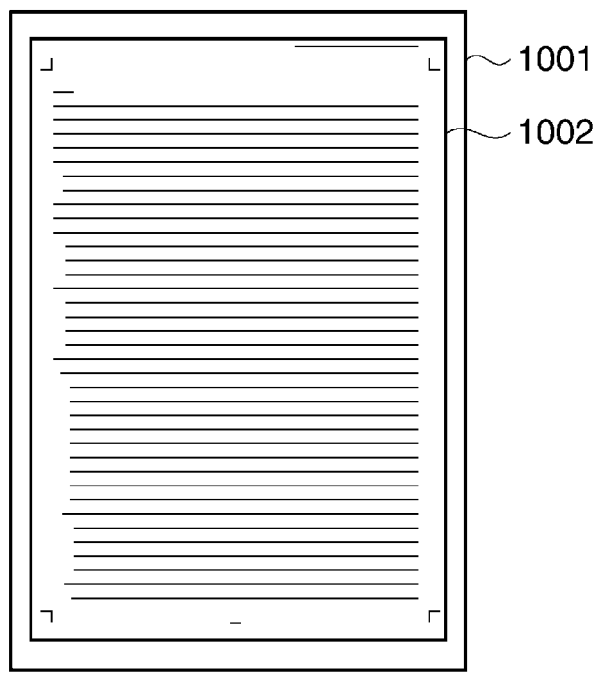
FIG. 11B is a view of an example of a bird's eye preview display area from which margins are excluded.

The CPU 111 may be configured to determine whether or not an original image includes a margin, when a bird's eye preview display image is formed in the step S506, S507, or S508 in FIG. 5 in the above-described first embodiment, and form, if the original image includes any margin, the bird's eye preview display image from only an area which contains no margins. FIG. 11B shows an example of the bird's eye preview display area from which margins are excluded.

In FIG. 11B, reference numeral 1101 denotes the bird's eye preview display area including a margin. On the other hand, reference numeral 1102 denotes the bird's eye preview display area from which the margin has been excluded. The area 1102 is changed from the area 1101 to an area from which the margin has been excluded.

According to the third embodiment, it is determined whether or not an area designated by the user includes a margin, and a displayed portion of the original image is changed such that an area exclusive of the margin is displayed. This makes it possible for the user to efficiently check an area that the user desires to check without displaying an unnecessary area for the user.

Although in the above-described embodiment, the description has been given of the case where the present invention is applied to a multifunction peripheral (MFP), this is not limitative, but the present invention may be applied to various apparatuses equipped with an image display function and a print function irrespective of whether the functions are installed in the same apparatus or separately in respective different apparatuses.

Further, although in the above-described embodiment, the description has been given of preview performed by the MFP during execution of a copy process, this is not limitative. For example, image data received by a facsimile function of the MFP may be stored in a memory within the MFP such that the user can use the image data for preview when the user selects the preview function in printing the image data. Furthermore, image data input by scanning or input from a PC via a communication medium may be stored in a memory within the MFP such that the user can perform preview of the image data for checking an image before instructing printing of the image data.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2011-281484 filed Dec. 22, 2011, which is hereby incorporated by reference herein in its entirety.

What is claimed is:

1. An image forming apparatus which is capable of performing preview display of an image on a display unit, comprising:
   a bird's eye preview unit configured to perform bird's eye preview display of the whole image by changing a size of the image to a size which enables the whole image to be displayed on the display unit, based on a printing resolution of the image, a display resolution of the display unit, sheet size information of the image, and display size information of the display unit;
   a real size preview unit configured to perform real size preview display of the image, in which a displayed image has a same size as a size of an image formed by printing the displayed image, based on the printing resolution of the image and the display resolution of the display unit; and
   a real size preview display area-setting unit configured to accept a setting of a preview display area of the image for being displayed by the real size preview display by said real size preview unit, which has been made on the image displayed by the bird's eye preview display by said bird's eye preview unit,
   wherein said real size preview unit displays an image within the area set by said real size preview display area-setting unit, on the display unit.

2. The image forming apparatus according to claim 1, wherein said real size preview display area-setting unit can accept at least one point from the image displayed by said bird's eye preview unit, and
   wherein said real size preview unit displays an image within an area including the at least one point accepted by said real size preview display area-setting unit, on the display unit.

3. The image forming apparatus according to claim 2, wherein when two points are accepted from the image displayed by said bird's eye preview unit, said real size preview display area-setting unit sets an area for displaying the image by said real size preview unit based on a center of a line segment connecting between the points.

4. The image forming apparatus according to claim 2, wherein when a size of the area including the at least one point accepted by said real size preview display area-setting unit is larger than a size of a display which can be made at a time by the display unit, said real size preview unit displays by animation an image within the area including the at least one point accepted by said real size preview display area-setting unit.

5. The image forming apparatus according to claim 2, further comprising:
   a margin determination unit configured to determine whether or not the area including the at least one point accepted by said real size preview display area-setting unit includes a margin,
   wherein when said margin determination unit determines that the area including the at least one point accepted by said real size preview display area-setting unit includes a margin, said real size preview display area-setting unit changes a position of the area including the at least one point to a position which excludes any margin.

6. The image forming apparatus according to claim 1, wherein said bird's eye preview unit compares the sheet size information of the image and the display size information of the display unit, to determine whether or not an aspect ratio of a size of a sheet for use in printing the image is larger than an aspect ratio of a display size of the display unit, and when it is determined that the aspect ratio of the size of the sheet is larger, said bird's eye preview unit performs preview display of the image by changing the size of the image to a size with which the whole image can be displayed in the display unit, based on a ratio between a lateral width of the display size of the display unit and a lateral width of the size of the sheet for use in printing the image.

7. The image forming apparatus according to claim 6, wherein said bird's eye preview unit, when it is determined that the aspect ratio of the size of the sheet is not larger than the aspect ratio of the display size of the display unit, said bird's eye preview unit performs preview display of the image by changing the size of the image to a size with which the whole image can be displayed in the display unit, based on a ratio between a vertical width of the display size of the display unit and a vertical width of the size of the sheet for use in printing the image.

8. A method of displaying an image by an image forming apparatus which is capable of performing preview display of an image on a display unit, comprising:
   performing bird's eye preview display of the whole image by changing a size of the image to a size which enables the whole image to be displayed on the display unit, based on a printing resolution of the image, a display resolution of the display unit, sheet size information of the image, and display size information of the display unit;
   performing real size preview display of the image, in which a displayed image has a same size as a size of an image formed by printing the displayed image, based on the printing resolution of the image and the display resolution of the display unit; and
   accepting a setting of a preview display area of the image for being displayed by the real size preview display, which has been made on the image displayed by the bird's eye preview display,
   wherein the real size preview display displays an image within the area set by said accepting, on the display unit.

9. A non-transitory computer-readable storage medium storing a computer-executable program for causing a computer to execute a method of displaying an image by an image forming apparatus which is capable of performing preview display of an image on a display unit, wherein the method comprises:

performing bird's eye preview display of the whole image by changing a size of the image to a size which enables the whole image to be displayed on the display unit, based on a printing resolution of the image, a display resolution of the display unit, sheet size information of the image, and display size information of the display unit;

performing real size preview display of the image, in which a displayed image has a same size as a size of an image formed by printing the displayed image, based on the printing resolution of the image and the display resolution of the display unit; and accepting a setting of a preview display area of the image for being displayed by the real size preview display, which has been made on the image displayed by the bird's eye preview display, wherein the real size preview display displays an image within the area set by said accepting, on the display unit.

* * * * *